United States Patent [19]

Clinton et al.

[11] 3,753,726

[45] Aug. 21, 1973

[54] REDUCING BITTERNESS PERCEPTION OF COFFEE BEVERAGES AND PRODUCTS

[75] Inventors: William P. Clinton, Monsey; Joel R. Kaplan, Ossining; Philip J. Capasso, Goshen, all of N.Y.

[73] Assignee: General Foods Corporation, White Plains, N.Y.

[22] Filed: June 9, 1971

[21] Appl. No.: 151,534

[52] U.S. Cl. .......... 99/65, 99/71
[51] Int. Cl. .......... A23f 1/04
[58] Field of Search .......... 99/65, 71, 140

[56] References Cited

OTHER PUBLICATIONS

Sivetz, "Coffee Processing Technology", 1963, pp. 73, 122 & 182.

Gardner, "Food Acidulants", 1966, pp. 112 and 172–713.

*Primary Examiner*—Frank W. Lutter
*Assistant Examiner*—William L. Mentlik
*Attorney*—Thomas R. Savoie, Daniel J. Donovan and Bruno P. Struzzi

[57] ABSTRACT

Coffee beverage products are treated to reduce the level of bitterness perceived by the beverage consumer by producing coffee products which will yield beverages containing an effective amount of a food acid such as citric acid. Alternatively effective amounts of the food acid may be added to the coffee beverage itself.

6 Claims, No Drawings

REDUCING BITTERNESS PERCEPTION OF COFFEE BEVERAGES AND PRODUCTS

This invention relates to improved coffee beverage compositions that have been treated to reduce or to remove undesirable bitter notes oftentimes detected by the consumer. The invention also relates to processes for preparing coffee products which will produce the improved beverage compositions.

Aqueous coffee beverages have widespread and popular appeal to consumers, primarily because of their flavors, but also because of other properties such as their mild stimulating effects. Occasionally, such beverages include undesirable bitter taste notes. These bitter notes may arise from the use of bitter coffee beans or through improper processing of the coffee beans such as by over-roasting or over extracting. Bitter taste notes may also arise from extended standing of the coffee liquor after extraction, while in contact with the atmosphere. Coffee that contains a high level of bitterness is not only undesirable flavorwise, but the bitterness is retained in the mouth as an aftertaste.

It is an object of this invention to reduce the level of bitterness in coffee beverages through the use of selected food acids. This invention is useful both in the production of soluble coffees and roasted and ground coffees. The food acid may be added to the coffee product at any time after the roasting operation including addition of the food acid directly to the liquid coffee beverage. More specifically, the food acid may be added to the liquid coffee extract prior to drying the extract to a soluble powder; alternatively, the food acid may be dry-blended with either a soluble coffee powder or with roasted and ground coffee.

It has been found according to this invention that selected food acids are capable of reducing the perception of bitterness at levels as low as about 3 milligrams (mg) of acid for each gram of soluble coffee solids present in the coffee beverage. For conventional hot coffee beverages, containing approximately 3 grams of coffee solids per 8 ounce cup, a range of at least 3 to 15 mg. of acid per gram of coffee solids has been found effective to significantly reduce bitterness perception without imparting significant acid notes. This range roughly converts to an acid level of 10 to 45 mg. of acid per 8 ounce cup.

Higher levels of acid addition are also effective to reduce the preception of bitterness and may be employed if it is desired to also impart an acid or sour note to the coffee beverage. Additionally it has been found that when this invention is adapted to powdered iced coffee beverage mixes a higher acid level may be required to significantly reduce bitterness perception.

When the food acid is added to liquid coffee extract prior to drying (e.g., spray drying, freeze drying, etc.) or to roasted and ground coffee prior to percolation, it may be necessary to add surplus amounts of the acid to provide for any degradation of the acid that may occur either during the drying or percolating operations. The presence of food acids in liquid coffee extracts, especially during the production of soluble coffee powders, may also be beneficial in reducing the amount of oxidation that occurs within the extract both on standing and/or during drying.

The precise mechanism by which the food acids are able to accomplish the purpose of this invention has not been fully ascertained. It has been postulated, however, that the food acids chemically complex with the compounds that are responsible for the bitter taste often perceived by coffee consumers.

The advantages of this invention are illustrated by comparisons wherein coffee beverages prepared from various coffee products were evaluated, with and without the additions of various food acids, by a panel of expert coffee tasters. In these laboratory taste tests a control (not acid) beverage was assigned a bitterness rating of 10 on a bitterness scale of 0 to 10 with decreased bitterness denoted by numbers less than 10 and a complete absence of bitterness rated as 0.

Identical coffee beverages, to which was added a measured amount of acid, were evaluated for level of bitterness against their respective controls. The amount of acid added to each beverage is expressed in terms of milligrams (mg.) of acid per cup (8 ounces) of coffee beverage, each cup containing 3.2 grams of soluble coffee solids and having a coffee solids concentration of 1.35 percent. The acids were added to the cups of coffee beverages in increments of 5 mg to determine the acid level where (1) the panel could first perceive a slight reduction in bitterness (threshold level), (2) the panel could identify a range of acid addition which optimizes bitterness reduction without imparting acid or sour notes (good range), and (3) the panel could first detect acid or sour notes (high level). The results for the addition of citric acid are summarized in Table 1.

TABLE 1

| Coffee product | Initial bitterness rating* | Citric acid threshold level, mg. | Bitterness rating* | Citric acid good range, mg. | Bitterness rating* | Citric acid high level, mg. |
|---|---|---|---|---|---|---|
| Agglomerated spray dried coffee (Instant Maxwell House) | 10 | 10 | 9 | 20–25 | 8 | 30 |
| Roast and ground coffee (Maxwell House Vacuum Pac) | 10 | 10 | 9 | 15–20 | 9 | 25 |
| Roast and ground coffee (75% Robusta blend) | 10 | 20 | 9 | 20–30 | 8 | 35 |
| R & G decaffeinated coffee (Sanka) | 10 | 25 | 9 | 30–35 | 9 | 40 |

*Bitterness Scale: Bitterness rating of 10 is assigned to beverage with no citric acid on a scale of 0 to 10 with decreased bitterness denoted as less than 10 and an absence of bitterness denoted as 0.

Adipic acid and fumaric acid were each substituted for the citric acid in the coffee beverages prepared from the agglomerated spray dried coffee product and were found to have an equally beneficial effect. A mixture of acetic and pyruvic acids (5 parts acetic to 1 part pyruvic) was found to have a slightly different effect than citric acid in that for the spray dried coffee beverage a threshold level of 15 mg (9.5 bitterness rating), a good range of 20–25 mg (9 bitterness rating) and a high level of 30 mg was identified. Ascorbic acid was found to be ineffective in reducing the bitterness perception of the spray dried coffee beverage.

This invention is also suitable as a means to correct for the improper processing of coffee wherein abnormally bitter coffee products are obtained due to over-roasting or overextracting. Naturally the more bitter the coffee beverage the greater is the amount of acid required to significantly reduce the bitterness.

The effect of citric acid on coffee beverages prepared from a standard green coffee blend, roasted in a laboratory, one-pound roaster for varying lengths of time was evaluated. A plurality of eight ounce cups of coffee (1.2 percent solids concentration) were prepared from each roasted and ground coffee by precolating each of the coffees in the same manner. The results are set forth in Table 2. As in Table 1 each control beverage (no acid) was assigned a bitterness level of 10 and beverages with varying amounts of acid were compared against their respective control.

TABLE 2

| Coffee product | | Initial bitterness rating* | Threshold level, mg. | Bitterness rating* | Good range, mg. | Bitterness rating* | High level, mg. |
|---|---|---|---|---|---|---|---|
| Roast time | Roast color | | | | | | |
| 6 min | 71 | 10 | 20 | 9 | 25-30 | 8 | 35 |
| 9 min | **64 | 10 | 15 | 9 | 20-25 | 8 | 30 |
| 11 min | 45 | 10 | 25 | 9.5 | 30-35 | 9 | 35 |
| 12.4 min | 35 | 10 | 35 | 8.5 | 40-45 | 8 | 50 |

*Refer to Table 1.
**Standard.

As is apparent from the description herein the amount of acid present in the coffee beverage which will be effective to significantly reduce bitterness will vary depending on both the nature of the coffee beverage itself and also the particular acid employed. However, one skilled in the art will be readily able to adapt the teachings of this invention to his own needs. It will also be apparent that there are variations and modifications of this invention and that the typical operating procedures may be varied without departing from the scope of the invention.

Having thus described the invention, what is claimed is:

1. A coffee product consisting of coffee and an amount of food acid effective to reduce the bitterness perception in coffee beverages produced therefrom without imparting significant acid notes, the food acid being present in an amount sufficient to enable production of coffee beverages containing from 3 to 15 milligrams of acid per gram of soluble coffee solids, and the food acid being selected from the group consisting of citric acid, fumaric acid, adipic acid, mixtures of acetic and pyruvic acids and combinations thereof.

2. A coffee product according to claim 1 wherein the food acid is added to a soluble coffee powder.

3. A coffee product according to claim 1 wherein the food acid is added to a roast and ground coffee.

4. A coffee product according to claim 3 wherein the roast and ground coffee has been overroasted.

5. A coffee product according to claim 1 wherein the food acid is added to liquid coffee extract and the extract is then dried to produce a soluble powder.

6. A coffee product according to claim 1 wherein the food acid is citric acid.

* * * * *